US008805340B2

(12) United States Patent
Lau et al.

(10) Patent No.: US 8,805,340 B2
(45) Date of Patent: Aug. 12, 2014

(54) METHOD AND APPARATUS PERTAINING TO CONTACT INFORMATION DISAMBIGUATION

(75) Inventors: Stephen Lau, Ottawa (CA); Jianqiang Shi, Nepean (CA); Darrin Kenneth John Fry, Kanata (CA)

(73) Assignee: BlackBerry Limited and QNX Software Systems Limited, Ontario (CA)

( * ) Notice: Subject to any disclaimer, the term of this patent is extended or adjusted under 35 U.S.C. 154(b) by 0 days.

(21) Appl. No.: 13/524,686

(22) Filed: Jun. 15, 2012

(65) Prior Publication Data

US 2013/0337781 A1    Dec. 19, 2013

(51) Int. Cl.
*H04M 3/42* (2006.01)

(52) U.S. Cl.
USPC ........................................ 455/414.1

(58) Field of Classification Search
USPC ............... 455/556.1, 63.3, 415, 414.1, 550.1, 455/456.1; 704/9, 250, 275, 235, 246, 251; 379/93.24, 142.06, 218.01
See application file for complete search history.

(56) References Cited

U.S. PATENT DOCUMENTS 6,421,672 B1 *   7/2002   McAllister et al. .................... 1/1
7,852,996 B2    12/2010   Lemke
8,374,628 B1 *   2/2013   Nelissen et al. ........... 455/456.1
2002/0046027 A1 *   4/2002   Tamura ........................ 704/250
2007/0276651 A1 * 11/2007   Bliss et al. ...................... 704/9
2009/0318119 A1   12/2009   Basir et al.

FOREIGN PATENT DOCUMENTS

EP          0920169 A1    6/1999
WO       2011/082731 A1   7/2011

OTHER PUBLICATIONS

Extended European Search Report from related European Patent Application No. 12172294.6 dated Oct. 26, 2012; 6 pages.

* cited by examiner

*Primary Examiner* — Kiet Doan
(74) *Attorney, Agent, or Firm* — Fitch, Even, Tabin & Flannery LLP

(57) ABSTRACT

These teachings provide for receiving from a user (via, for example, a voice-recognition component) a name-based identifier for an entity to be contacted via wireless communications and then using that name-based identifier to access a contacts list to identify a corresponding communications address to use when contacting the entity via the wireless communications. Upon determining that the contacts list includes at least two contacts having the same name-based identifier, these teachings then provide for providing to the user location information as pertains to at least one of the candidate contacts to thereby facilitate disambiguation.

8 Claims, 2 Drawing Sheets

METHOD AND APPARATUS PERTAINING TO CONTACT INFORMATION DISAMBIGUATION

FIELD OF TECHNOLOGY

The present disclosure relates to communications devices and more particularly to stored contacts information.

BACKGROUND

Communications devices of various kinds are known in the art including portable, wireless two-way communications devices. Devices that support cellular telephony comprise a particularly ubiquitous example in these regards. Such devices are often configured to initiate a wireless communication by using a particular communications address (such as, but not limited to, a telephone number) as corresponds to a specific entity to be called.

To ease the use of such communications addresses, many devices store contact information. For example, a given device may store one or more contacts lists that correlate one or more communications addresses with each of a plurality of contact identifiers. As a very simple example in these regards, a given contacts list might include the names of a plurality of persons along with a telephone number as corresponds to each such person. To further ease the use of such information, many devices permit a user to identify a particular contact by name (using, for example, a voice-recognition capability). The device then uses that name to access such a contacts list to identify the communications address to use to initiate a call to that particular person.

It is possible, however, for a given contacts list to include two or more contacts who share a same name. Such instances can be especially numerous when the user only stores a single name (such as only the given name or only the family name) for some or all of their contacts. When such a situation occurs the device will typically further prompt the user in some way in order to disambiguate between the candidate contacts in order to identify the appropriate communications address to use. For example, the device may use a text-to-speech capability to audibilize the telephone numbers for each candidate contact in order to help the user identify the correct person to call.

Typical disambiguation approaches in these regards, however, do not necessarily meet the needs of all users. Some users, for example, may not recall the telephone number of the person they are calling. In such a case, it may not be helpful to provide such a user with the telephone numbers of the candidate contacts. Instead, such approaches can delay or completely frustrate the desired communication while possibly aggravating the user as well.

DETAILED DESCRIPTION

Figure 1:
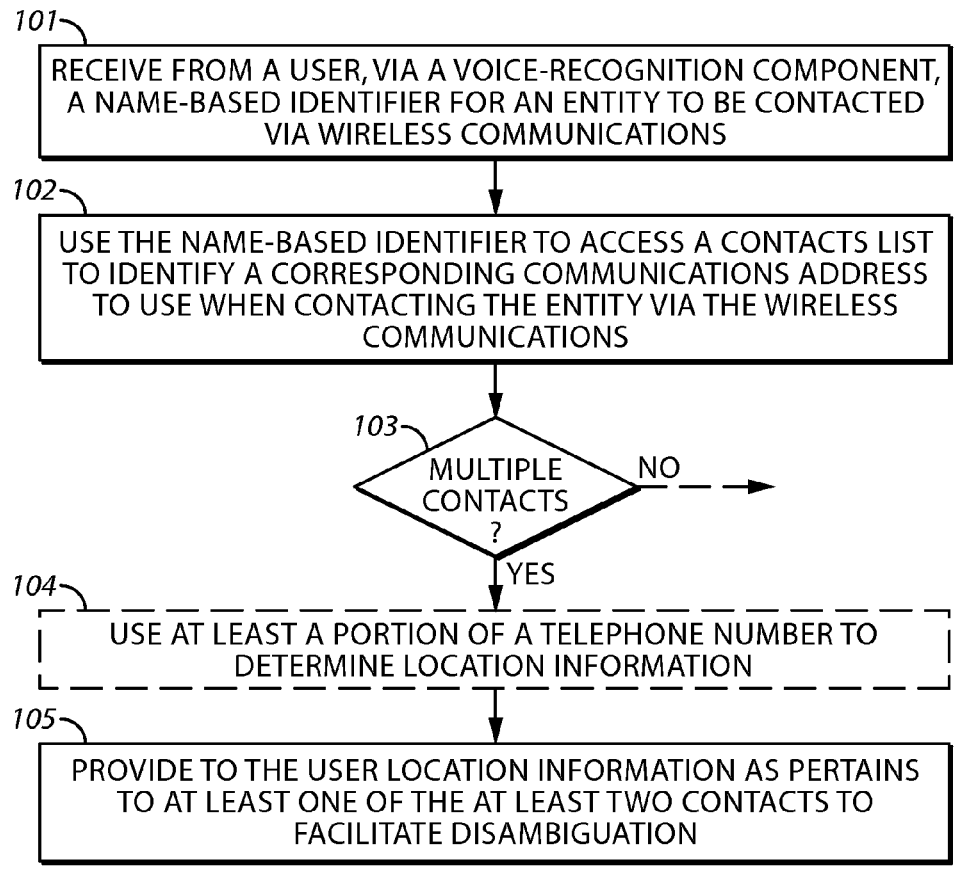
FIG. 1 is a flow diagram in accordance with the disclosure.

The following describes an apparatus and method pertaining to facilitating disambiguation between two or more candidate contacts. By one approach these teachings provide for receiving from a user (via, for example, a voice-recognition component) a name-based identifier for an entity to be contacted via wireless communications and then using that name-based identifier to access a contacts list to identify a corresponding communications address to use when contacting the entity via the wireless communications. Upon determining that the contacts list includes at least two contacts having the same name-based identifier, these teachings then provide for providing to the user location information as pertains to at least one of the candidate contacts to thereby facilitate disambiguation.

For example, and without intending any particular limitations in these regards, when the communications addresses comprise telephone numbers, one or more portions of the telephone numbers (such as the country code and/or area code) are used to access corresponding location information such as geographic information that corresponds to the aforementioned portions.

By one approach, these teachings provide the aforementioned location to the user in an audible form. Such an approach can preserve a current user-interface modality when the user has input the contact information verbally.

So configured, a user can be provided with location information as corresponds to unambiguated contacts rather than telephone numbers. In many instances the user will be more familiar and knowing regarding the locations of their contacts than of the specific telephone numbers for their contacts. Accordingly, these teachings provide disambiguation information that is often more likely to be useful to the user in these regards and hence more likely to achieve the desired disambiguation result.

These teachings are highly flexible in practice and will accommodate a wide variety of user-interface modalities to both receive information from the user and when providing information to the user. These teachings are also highly scalable and will accommodate a wide variety and number of communications addresses and location-based correlations.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

FIG. 1 presents a process 100 that comports with many of these teachings. For the purpose of illustration but without necessarily intending any particular limitations in these regards, it will be presumed in this description that a control circuit of choice carries out this process 100. Further details in these regards are provided below.

This process 100 provides for receiving 101, from a user, a name-based identifier for an entity that the user wishes to contact via wireless communications (such as, but not limited to, cellular telephony). By one approach, the user inputs the name-based based identifier via a voice-recognition component. In such a case, and by way of example, the user might verbalize the entity's given name (such as "Bob" or "Sun"), the entity's family name (such as "Smith" or "Ho"), two or more of the entity's names (such as "Bob Smith" or "Sun Ho"), a nickname or informal moniker for the entity (such as "Fudd" or "Speedy"), or any other word or phrase by which the user knows the entity. (Depending upon the application setting the user may include other expressions or commands as well, such as "Call," "Dial," and so forth.)

This process 100 then provides for using 102 that name-based identifier to access a contacts list to identify a corresponding communications address to use when contacting the entity via the wireless communications. This contacts list generally comprises stored data that includes information regarding a plurality of entities. This information can comprise, for example, one or more names for each such entity and at least one communications address as corresponds to each entity. These communications addresses can comprise, for example, one or more telephone numbers. These telephone numbers can include, in turn, personal and/or business landline-based telephone numbers, personal and/or business mobile telephone numbers, and so forth.

Those skilled in the art will recognize that there are various forms and approaches by which such contact information can be stored. As these various approaches are well known in the art, and further as the present teachings are not overly sensitive to the selection of any particular approach in these regards, further elaboration in these regards will not be provided here for the sake of brevity and simplicity.

It should be noted, however, that these teachings will readily accommodate using 102 the name-based identifier to access a plurality of contacts lists that may be stored on the user's device or that are otherwise accessible to the user's device. Accordingly, it will be understood that the described accessing of a contacts list includes accessing one or more physically and/or logically discrete contacts lists as desired.

This process 100 then provides for determining 103 whether the contacts list includes at least two contacts having the same name-based identifier. For example, such a circumstance can arise when the user utters "Bob" and there are three contacts in the contacts list named "Bob." (In the absence of detecting at least two such contacts this process 100 can accommodate any of a variety of responses. By one approach this can comprise simply carrying on with a voice-responsive call-initiation process that makes use of the communications address that corresponds to the name-based identifier received from the user.)

When there are two or more contacts in the contacts list that match the user's name-based identifier, these teachings provide for obtaining corresponding location information for the received name-based identifier. As one optional approach in these regards, the process 100 provides for using 104 at least a portion of the telephone numbers as correspond to the contacts that match the name-based identifier to determine such location information. Such an approach can comprise, for example, using the country code and/or area code fields of relevant telephone numbers to obtain the location information.

By way of example, presume that the name-based identifier is the name "Bob" and that the contacts list includes two contacts named "Bob." The first "Bob" has the telephone number "847 555-1234" while the second "Bob" has the telephone number "208 555-6789." Using the area code field for the telephone number for the first "Bob," which is "847," the process 100 can determine the location "Illinois." Using the area code field for the telephone number for the second "Bob," which is "208," the process 100 can determine the location "Idaho."

By one approach the process 100 can make such determinations locally. When a cellular telephone carries out the process 100, this local determination can comprise using only presently-stored information. By another approach, the process 100 can make such determinations using remotely-sourced information. When a cellular telephone carries out the process 100, this use of remotely-sourced information can comprise having the cellular telephone access, at the time of need, a remote server of choice. These two approaches can be used in lieu of one another or can be combined as desired. For example, the process 100 can provide for first attempting to make use of locally-stored information and, when that attempt proves insufficient, then accessing a remote information resource to obtain the location information.

In any event, this process 100 then provides 105 to the user the location information as pertains to at least one of the contacts as match the name-based identifier. By one approach this can comprise providing the location information to the user in an audible form (using, for example, an available text-to-speech synthesis capability as is known in the art). For example, when the user has specified "Bob," this process 100 could provide for audibilizing something like, "More than one contact matches the name Bob. Say 'yes' if you wish to contact the Bob in Illinois." Following a brief pause the process 100 could then provide for further audibilizing, "Say 'yes' if you wish to contact the Bob in Idaho." And so forth. These teachings will of course accommodate a wide variety of ways by which the location information, and corresponding selection opportunities, are communicated to the user.

Figure 2:
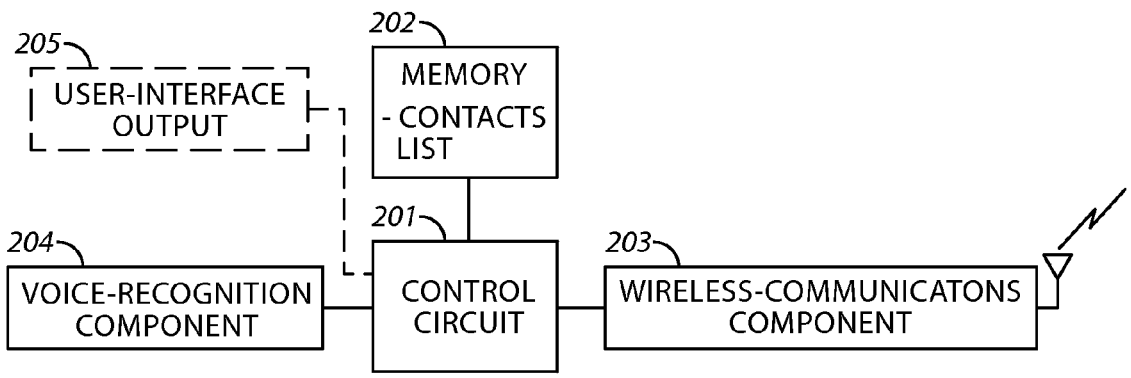
FIG. 2 is a block diagram in accordance with the disclosure.

As noted above, these teachings can be carried out by a control circuit of choice. FIG. 2 provides some illustrative examples in these regards. FIG. 2 depicts an apparatus 200 having a control circuit 201 that operably couples to a memory 202. Such a control circuit 201 can comprise a fixed-purpose hard-wired platform or can comprise a partially or wholly programmable platform. These architectural options are well known and understood in the art and require no further description here. This control circuit 201 is configured (for example, by using corresponding programming as will be well understood by those skilled in the art) to carry out one or more of the steps, actions, and/or functions described herein.

The memory 202 may be integral to the control circuit 201 or can be physically discrete (in whole or in part) from the control circuit 201 as desired. This memory 202 can also be local with respect to the control circuit 201 (where, for example, both share a common circuit board, chassis, power supply, and/or housing) or can be partially or wholly remote with respect to the control circuit 201 (where, for example, the memory 202 is physically located in another facility, metropolitan area, or even country as compared to the control circuit 201).

This memory 202 can serve to store the aforementioned contacts list. This memory 202 can also serve, for example, to non-transitorily store the computer instructions that, when executed by the control circuit 201, cause the control circuit 201 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).).

In this illustrative example the control circuit 201 also operably couples to a wireless-communications component 203 (such as a cellular-telephony transceiver that supports cellular telephony) and a voice-recognition component 204 (to facilitate receiving, for example, the aforementioned verbally-articulated name-based identifier from the user). These components are very well known in the art and require no further elaboration here.

If desired, this apparatus 200 also includes a user-interface output 205 such as, but not limited to, a text-to-speech audibilization component that permits, for example, the aforementioned location information to be provided to the user in a verbalized form. Various examples of these components are again well known in the art.

Figure 3:
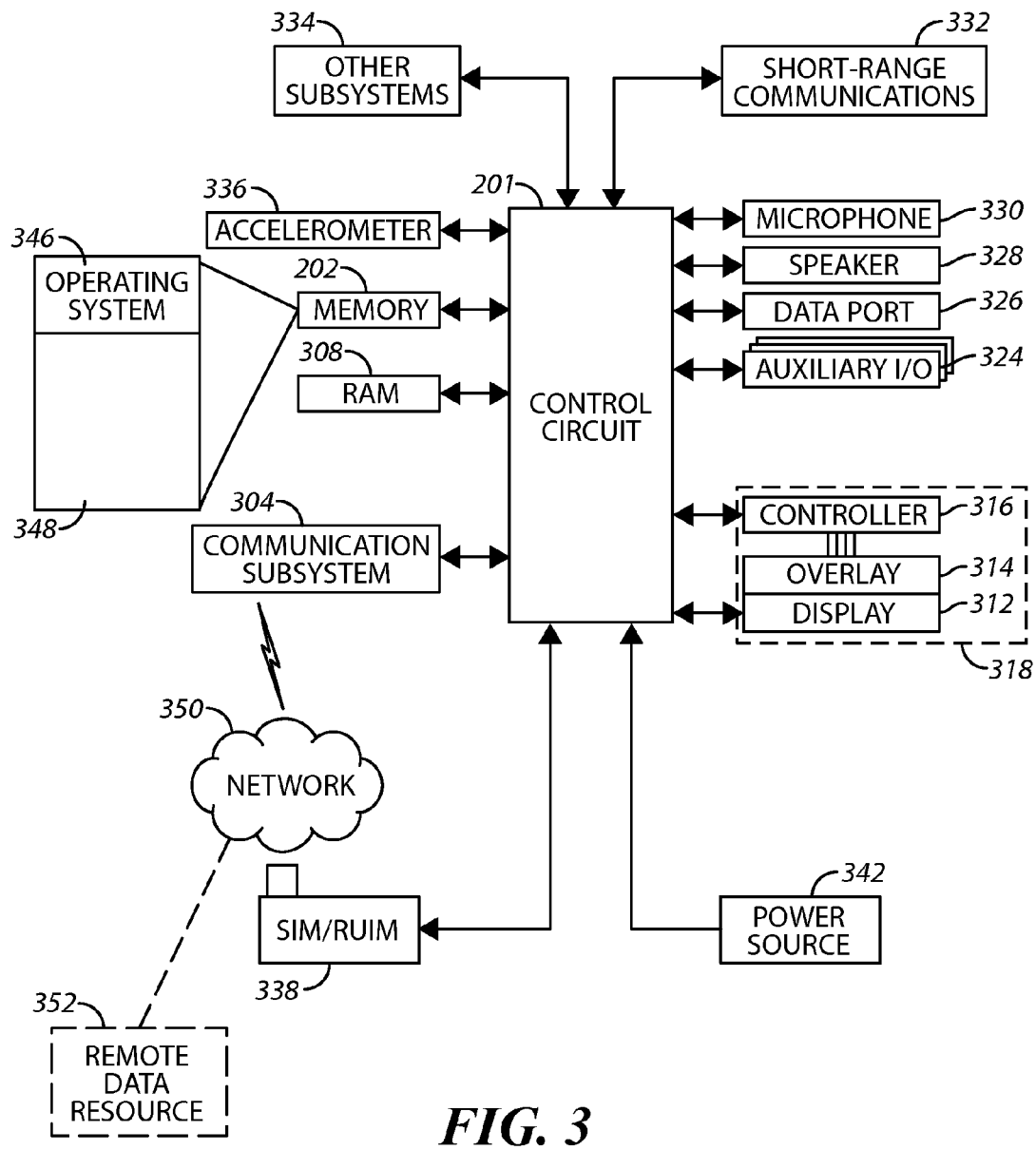
FIG. 3 is a block diagram in accordance with the disclosure.

Such an apparatus 200 can comprise any of a wide variety of enabling devices. By one approach, such an apparatus 200 can comprise a portable communications device as illustrated in FIG. 3

This exemplary portable communications device includes a control circuit 201 that controls the overall operation of the portable communications device. Communication functions, including data and voice communications, are performed through a communication subsystem 304. The communication subsystem receives messages from and sends messages to a wireless network 350. The wireless network 350 may be any type of wireless network, including, but not limited to, data wireless networks, voice wireless networks, and networks that support both voice and data communications. Such a wireless network 350, in turn, can serve to connect the portable communications device to one or more remote data resources 352 to provide access to the aforementioned remotely-sourced location information if desired.

A power source 342, such as one or more rechargeable batteries or a port to an external power supply, powers the electronic device.

The control circuit 201 interacts with other elements, such as Random Access Memory (RAM) 308, the aforementioned memory 202, a display 312 with a touch-sensitive overlay 314 operably coupled to an electronic controller 316 that together comprise an optional touch-sensitive display 318, an auxiliary input/output (I/O) subsystem 324, a data port 326, a speaker 328 (to facilitate audibilizing, for example, the aforementioned verbalized location information), a microphone 330 (to facilitate the user inputting the aforementioned name-based identifier), a short-range communication subsystem 332, and other device subsystems 334 of choice (such as, but not limited to, the aforementioned voice-recognition component).

One or more user interfaces are provided. Input via a graphical user interface is provided via the touch-sensitive overlay 314. The control circuit 201 interacts with the touch-sensitive overlay 314 via the electronic controller 316. Information, such as text, characters, symbols, images, icons, and other items that may be displayed or rendered on a portable electronic device, is displayed on the touch-sensitive display 318 via the control circuit 201.

The control circuit 201 may interact with an accelerometer 336 that may be utilized to detect direction of gravitational forces or gravity-induced reaction forces.

To identify a subscriber for network access, the portable electronic device may utilize a Subscriber Identity Module or a Removable User Identity Module (SIM/RUIM) card 338 for communication with a network, such as the wireless network 350. Alternatively, user identification information may be programmed into the memory 202.

The portable electronic device includes an operating system 346 and software programs, applications, or components 348 that are executed by the control circuit 201 and are typically stored in a persistent, updatable store such as the memory 202. Additional applications or programs may be loaded onto the portable communications device through the wireless network 350, the auxiliary I/O subsystem 324, the data port 326, the short-range communications subsystem 332, or any other suitable subsystem 334.

So configured, a portable electronics device such as a portable communications device can received a verbalized name-based identifier and, upon determining that ambiguity exists regarding which of a plurality of contacts the user actually intends to contact, determine location information as corresponds to communications addresses that correspond to the candidate contacts and provide at least some of that location information to the user to facilitate disambiguation in those regards. For many users it will be more helpful to hear location information as a disambiguation cue than to hear, for example, the communications addresses for the candidate contacts. The present teachings are able to make good upon this likelihood without requiring the user to have entered actual location information for the contacts (such as street addresses) because these teachings are able to leverage existing communications addresses to obtain the corresponding location information.

The present disclosure may be embodied in other specific forms without departing from its essential characteristics. As but one illustrative example in these regards, when a given contact has a number of telephone numbers associated with their name (including, say, a business number, a mobile number, a personal landline number, and so forth), and at least some of those telephone numbers have differing area codes, these teachings will support providing only one location to the user as corresponds to only one of those area codes or, if desired, providing two or more different locations as all correspond to this particular contact.

The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

We claim:

1. An apparatus comprising:
a memory having a contacts list stored therein;
a voice-recognition component;
a wireless-communications component;
a control circuit operably coupled to the memory, the voice-recognition component, and the wireless-communications component and configured to:
receive from a user, via the voice-recognition component, a name-based identifier for an entity to be contacted via the wireless-communications component;
use the name-based identifier to access the contacts list to identify a corresponding communications address that comprises a telephone number to use when contacting the entity via the wireless-communications component;
upon determining that the contacts list includes at least two contacts having the same name-based identifier, use at least a portion of the telephone number for each of the at least two contacts to determine corresponding location information for each of the at least two contacts and provide to the user the location information as pertains to at least one of the at least two contacts to facilitate disambiguation,
wherein the control circuit is configured to use at least a portion of the telephone number to determine a corresponding location by, at least in part, accessing a remote data resource to obtain the corresponding location.

2. The apparatus of claim 1 wherein the apparatus comprises a portable communications device.

3. The apparatus of claim 1 wherein the wireless-communications component comprises a cellular-telephony transceiver.

4. The apparatus of claim 1 wherein the portion of the telephone number comprises at least one of a country code and an area code.

5. The apparatus of claim 1 wherein the control circuit is configured to provide the location information to the user in an audible form.

6. A method comprising:
   by a control circuit:
   receiving from a user, via a voice-recognition component, a name-based identifier for an entity to be contacted via wireless communications;
   using the name-based identifier to access a contacts list to identify a corresponding communications address that comprises a telephone number to use when contacting the entity via the wireless communications;
   upon determining that the contacts list includes at least two contacts having the same name-based identifier, using at least a portion of the telephone number for each of the at least two contacts to determine corresponding location information for each of the at least two contacts and providing to the user the location information as pertains to at least one of the at least two contacts to facilitate disambiguation,
   wherein using at least a portion of the telephone number to determine the location information comprises, at least in part, accessing a remote data resource to obtain the location information.

7. The method of claim 6 wherein the portion of the telephone number comprises at least one of a country code and an area code.

8. The method of claim 6 wherein providing the location information to the user comprises, at least in part, providing the location information to the user in an audible form.

* * * * *